(12) United States Patent
Widmer et al.

(10) Patent No.: US 9,365,126 B2
(45) Date of Patent: Jun. 14, 2016

(54) SYSTEM AND METHOD FOR DETECTING THE PRESENCE OF A MOVING OBJECT BELOW A VEHICLE

(71) Applicant: QUALCOMM Incorporated, San Diego, CA (US)

(72) Inventors: Hanspeter Widmer, Wohlenschwil (CH); Lukas Sieber, Olten (CH); Markus Bittner, Sarmenstorf (CH)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 14/059,299

(22) Filed: Oct. 21, 2013

(65) Prior Publication Data

US 2014/0333256 A1 Nov. 13, 2014

Related U.S. Application Data

(60) Provisional application No. 61/822,114, filed on May 10, 2013.

(51) Int. Cl.
*H02J 7/00* (2006.01)
*H01F 27/42* (2006.01)
(Continued)

(52) U.S. Cl.
CPC ............ *B60L 11/182* (2013.01); *B60L 11/14* (2013.01); *B60L 11/1824* (2013.01);
(Continued)

(58) Field of Classification Search
CPC ....................................................... H02J 7/025
USPC .......................................................... 320/108
See application file for complete search history.

(56) References Cited

U.S. PATENT DOCUMENTS

2006/0113955 A1 6/2006 Nunally
2009/0174264 A1 7/2009 Onishi et al.
(Continued)

FOREIGN PATENT DOCUMENTS

WO WO-2009013347 A1 1/2009
WO WO-2013001812 A1 1/2013

OTHER PUBLICATIONS

IEEE: "IEEE 100 The Authoritative Dictionary of IEEE Standards Terms", Standards Information Network, XP002732256, Dec. 31, 2000, vol. 7th, 1 page.
(Continued)

*Primary Examiner* — Edward Tso
*Assistant Examiner* — Ahmed Omar
(74) *Attorney, Agent, or Firm* — Knobbe, Martens, Olson & Bear LLP

(57) ABSTRACT

This disclosure provides systems, methods and apparatus for detecting the presence of an object or living being below a vehicle. In one aspect a wireless charging system for an electric vehicle is provided. The system includes a vehicle charging pad configured to wirelessly receive power from a base charging pad spaced from the vehicle charging pad. The system further includes a detection apparatus on a surface of the vehicle. The detection apparatus is configured to detect existence of a moving object within an exclusion zone underneath the vehicle. The detection apparatus includes at least one antenna assembly configured to transmit radiation and to receive radiation reflected from material within the exclusion zone. The at least one antenna assembly has a radiation pattern for at least one of the transmitted radiation and the received radiation, the radiation pattern having a maximum gain and having a first gain along a first line perpendicular to the surface less than half of the maximum gain on a linear scale.

37 Claims, 15 Drawing Sheets

(51) Int. Cl.
*B60L 11/18* (2006.01)
*G01S 13/56* (2006.01)
*H01Q 21/00* (2006.01)
*B60L 11/14* (2006.01)
*H01Q 9/04* (2006.01)
*H01Q 21/06* (2006.01)
*H02J 7/02* (2016.01)
*H02J 17/00* (2006.01)

(52) U.S. Cl.
CPC ........ B60L 11/1833 (2013.01); B60L 11/1842 (2013.01); B60L 11/1844 (2013.01); B60L 11/1846 (2013.01); G01S 13/56 (2013.01); H01Q 9/0407 (2013.01); H01Q 21/00 (2013.01); H01Q 21/065 (2013.01); *B60L 2200/12* (2013.01); *B60L 2200/22* (2013.01); *B60L 2210/30* (2013.01); *B60L 2210/40* (2013.01); *B60L 2250/16* (2013.01); *B60L 2270/147* (2013.01); *H02J 7/025* (2013.01); *H02J 17/00* (2013.01); *Y02E 60/721* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 2010/0149042 A1 | 6/2010 | Utsi et al. |
| 2011/0057606 A1* | 3/2011 | Saunamaki ............ H02J 7/025 320/108 |
| 2012/0091993 A1 | 4/2012 | Uramoto et al. |
| 2012/0187757 A1* | 7/2012 | Wechlin ................ B60L 11/182 307/9.1 |
| 2013/0069441 A1 | 3/2013 | Verghese et al. |

OTHER PUBLICATIONS

International Search Report and Written Opinion—PCT/US2014/035468—ISA/EPO—Nov. 26, 2014.

* cited by examiner

SYSTEM AND METHOD FOR DETECTING THE PRESENCE OF A MOVING OBJECT BELOW A VEHICLE

RELATED APPLICATIONS

This application claims the benefit of priority to U.S. Provisional Appl. No. 61/822,114, filed on May 10, 2013 and incorporated in its entirety by reference herein.

FIELD

The present disclosure relates generally to wireless power transfer, and more specifically to devices, systems, and methods related to wireless power transfer to remote systems such as vehicles including batteries, and to systems and methods for detecting the presence of objects within a region between a vehicle chassis and a charging base beneath the vehicle chassis.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge their batteries. Vehicles that are solely electric generally receive the electricity for charging the batteries from external sources and from recuperation of braking energy. Battery electric vehicles (electric vehicles) are often proposed to be charged through some type of wired alternating current (AC) such as household or commercial AC or DC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless charging system for an electric vehicle. The system comprises a vehicle charging pad configured to wirelessly receive power from a base charging pad spaced from the vehicle charging pad. The system further comprises a detection apparatus on a surface of the vehicle. The detection apparatus is configured to detect existence of a moving object within an exclusion zone underneath the vehicle. The detection apparatus comprises at least one antenna assembly configured to transmit radiation and to receive radiation reflected from material within the exclusion zone. The at least one antenna assembly has a radiation pattern for at least one of the transmitted radiation and the received radiation, the radiation pattern having a maximum gain and having a first gain along a first line perpendicular to the surface less than half of the maximum gain on a linear scale.

Another aspect of the disclosure provides a method of controlling a wireless charging system of an electric vehicle. The method comprises transmitting energy waves in a pattern in a region below an underside surface of the electric vehicle. The pattern has a maximum gain and has a first gain along a first line perpendicular to the surface less than half of the maximum gain on a linear scale. The method further comprises receiving energy waves reflected from material within the region. The method further comprises analyzing the received energy waves to determine whether the received energy waves are indicative of a moving object within the region.

Another aspect of the disclosure provides a method of controlling a wireless charging system of an electric vehicle. The method comprises transmitting energy waves in a region below an underside surface of the electric vehicle. The method further comprises receiving, in a pattern, energy waves reflected from material within the region. The pattern has a maximum gain and has a first gain along a first line perpendicular to the surface less than half of the maximum gain on a linear scale. The method further comprises analyzing the received energy waves to determine whether the received energy waves are indicative of a moving object within the region.

Another aspect of the disclosure provides a wireless charging system for an electric vehicle. The system comprises means for wirelessly transferring power to the electric vehicle, at least one means for receiving electromagnetic radiation, and at least one means for transmitting electromagnetic radiation. At least one of the received electromagnetic radiation and the transmitted electromagnetic radiation has a radiation pattern. The radiation pattern has a maximum gain and has a first gain along a first line perpendicular to the surface less than half of the maximum gain on a linear scale.

Figure 1:
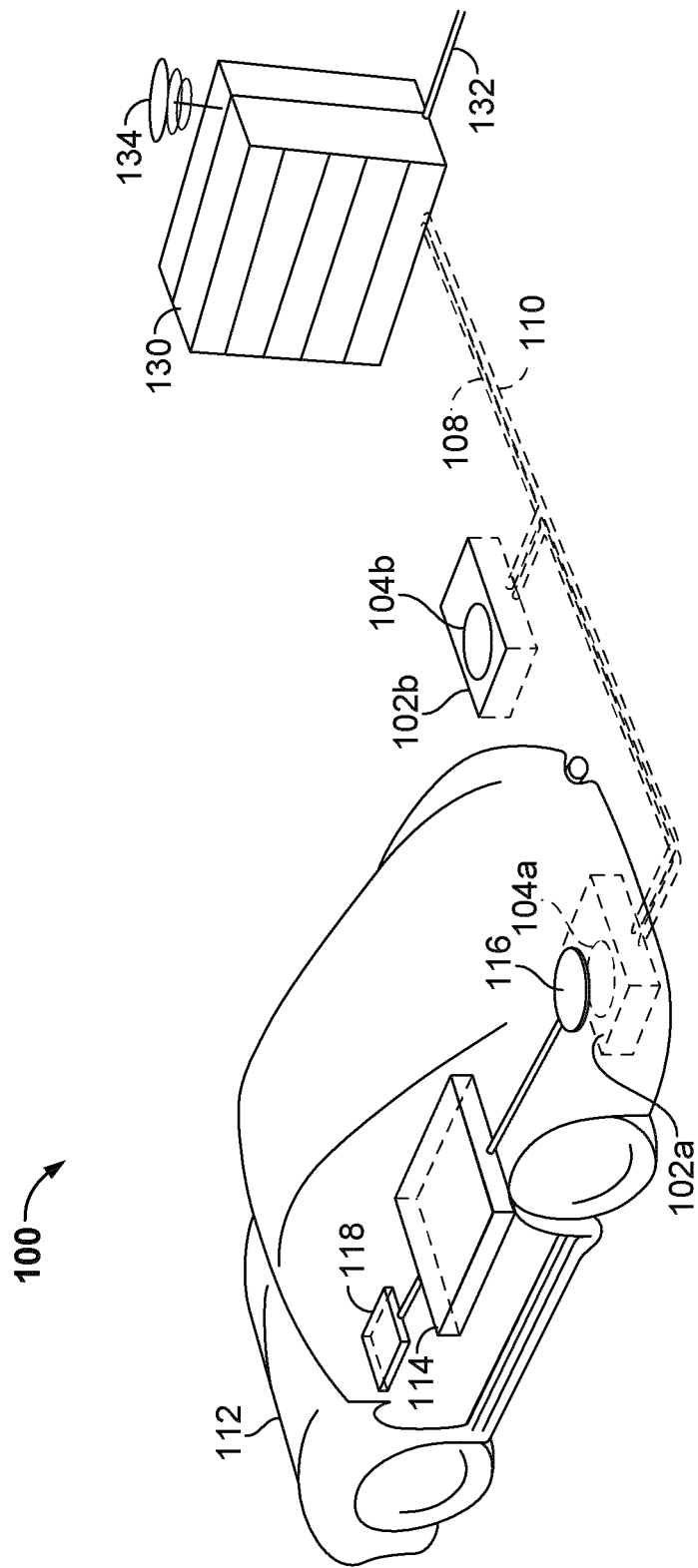
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $½π$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
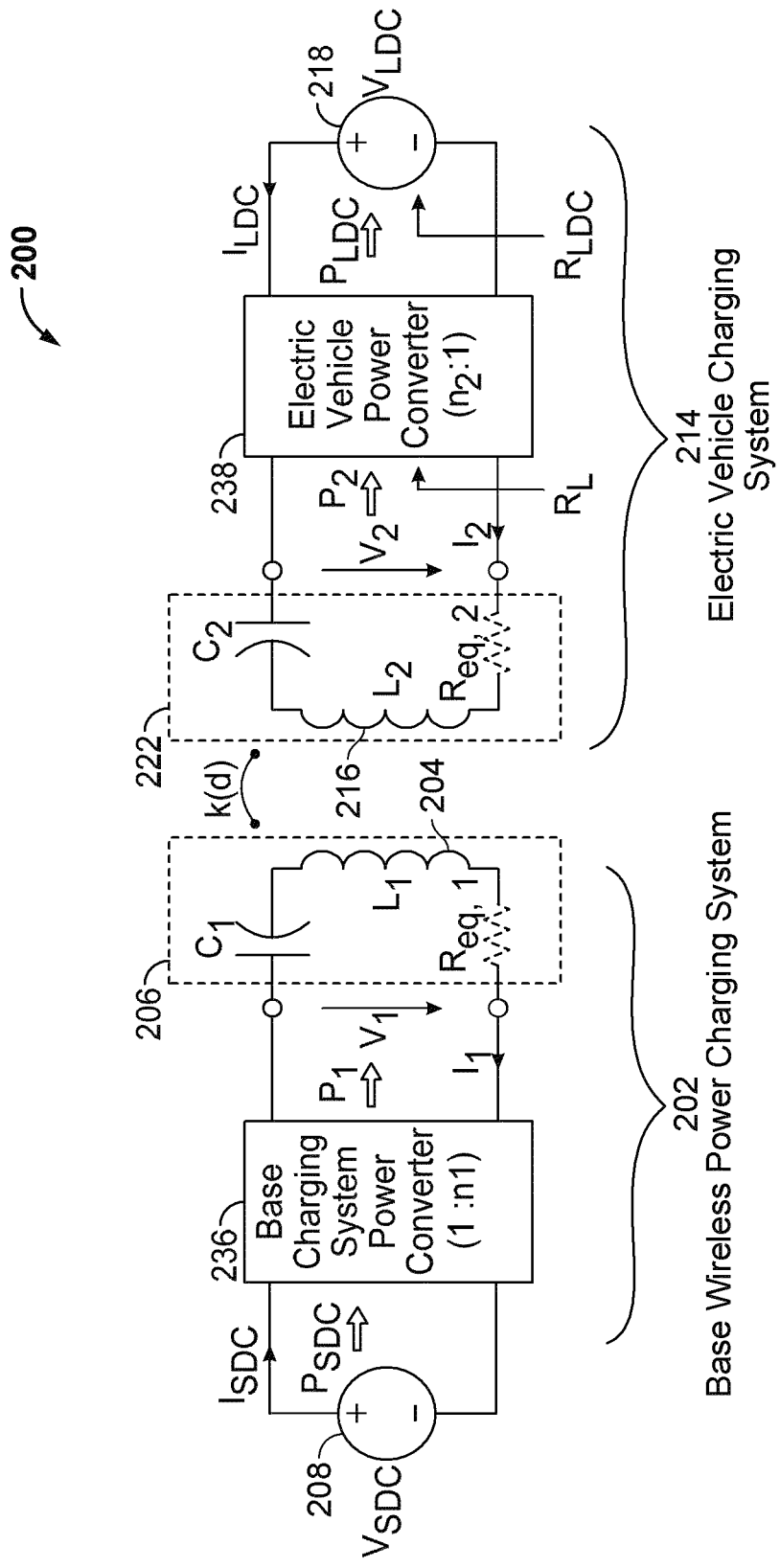
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
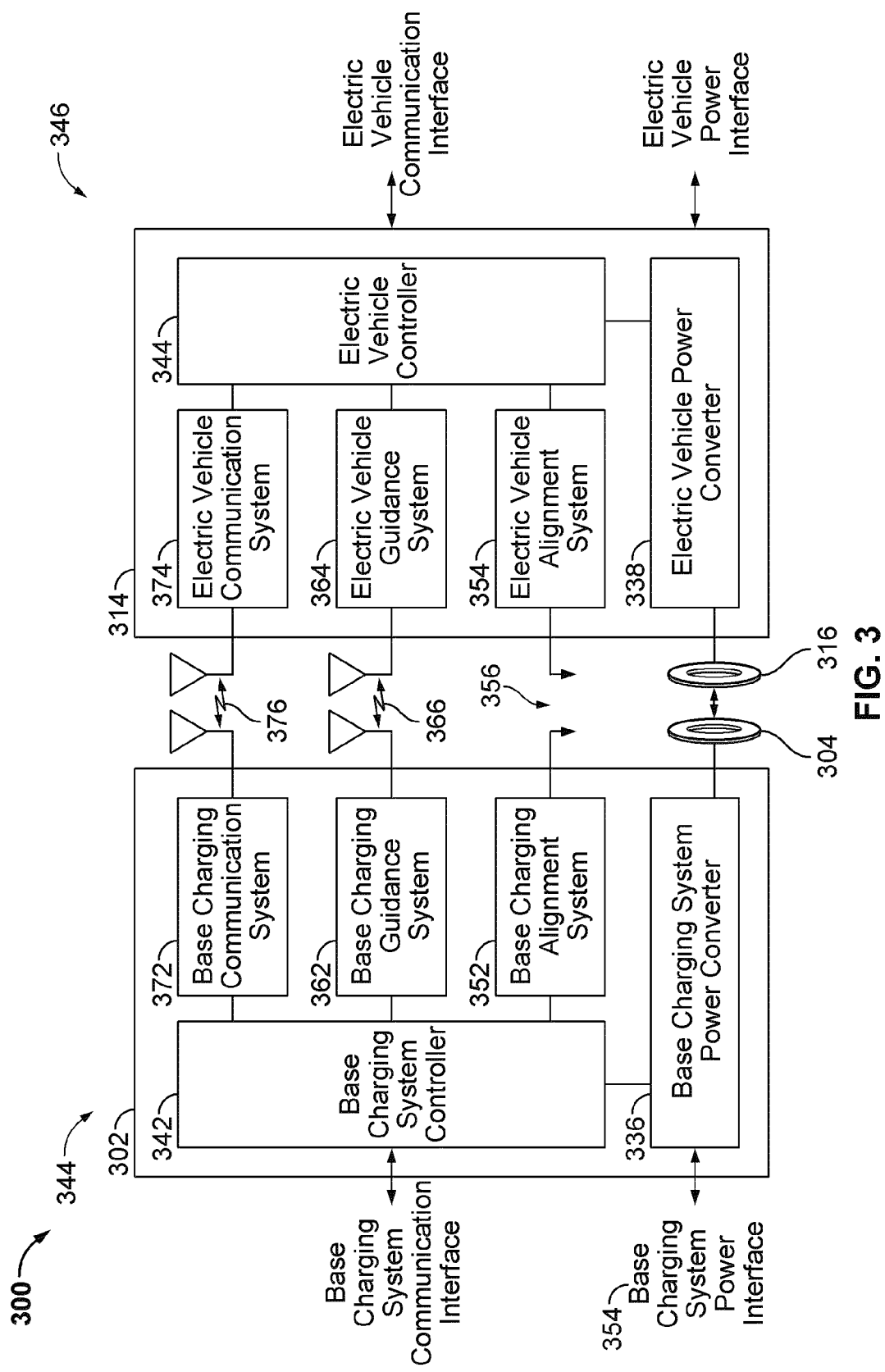
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
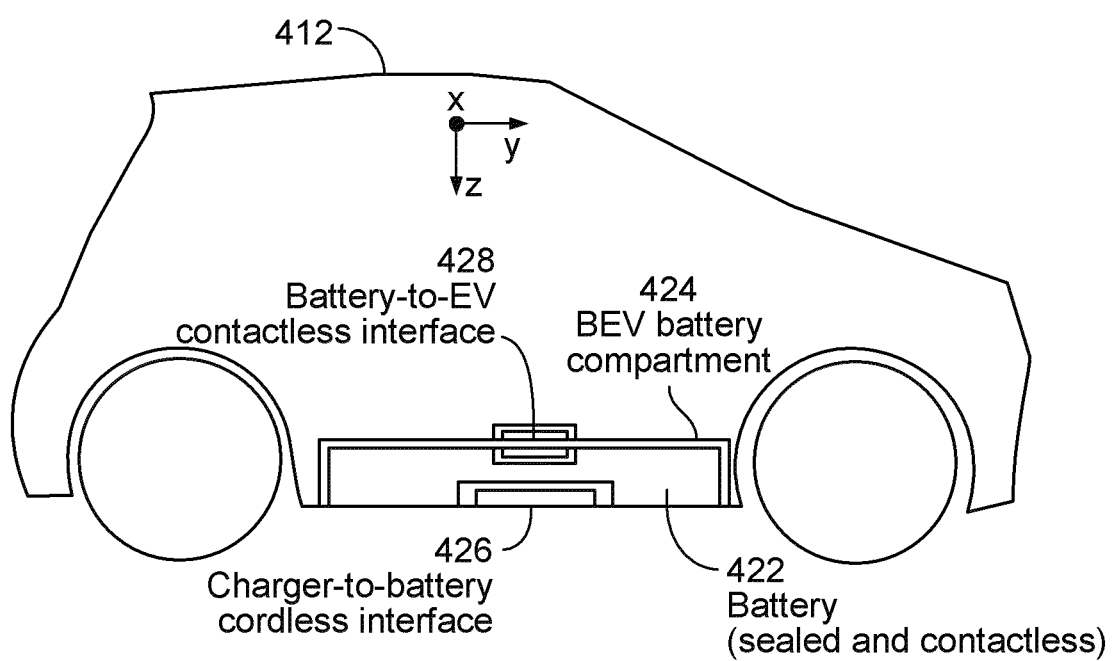
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
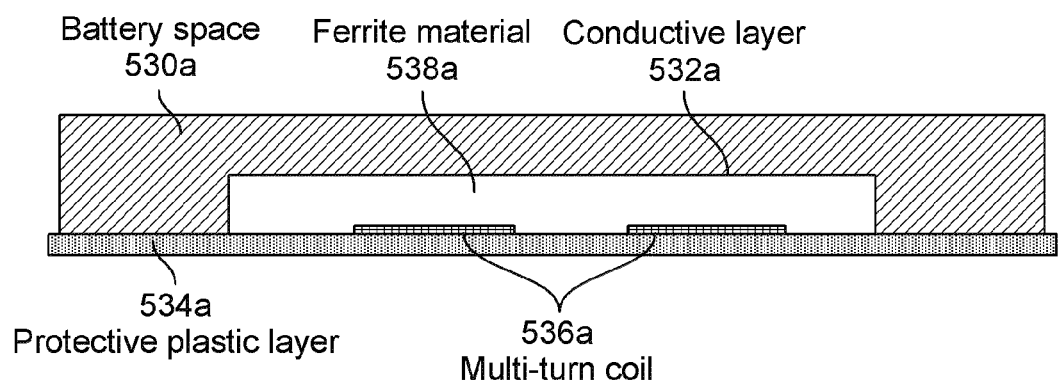
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
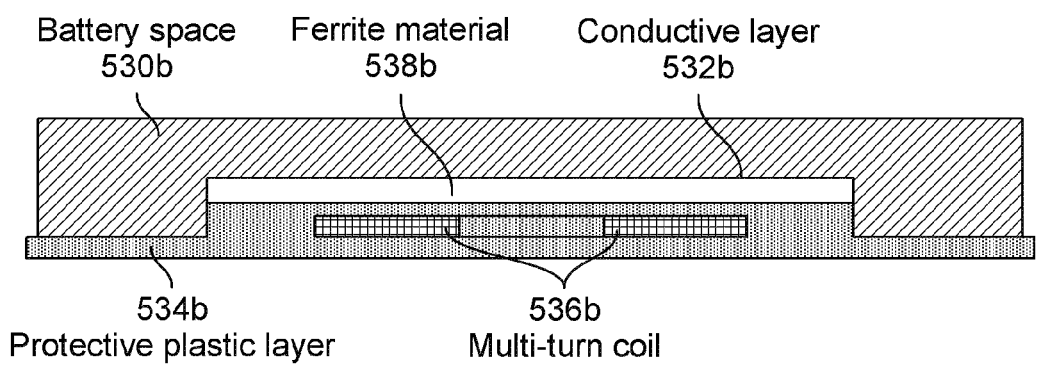

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
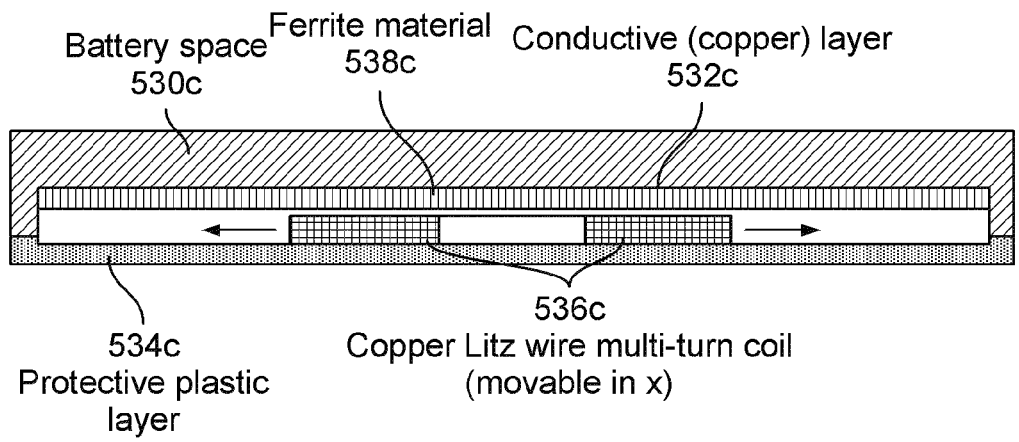
Figure 5D:
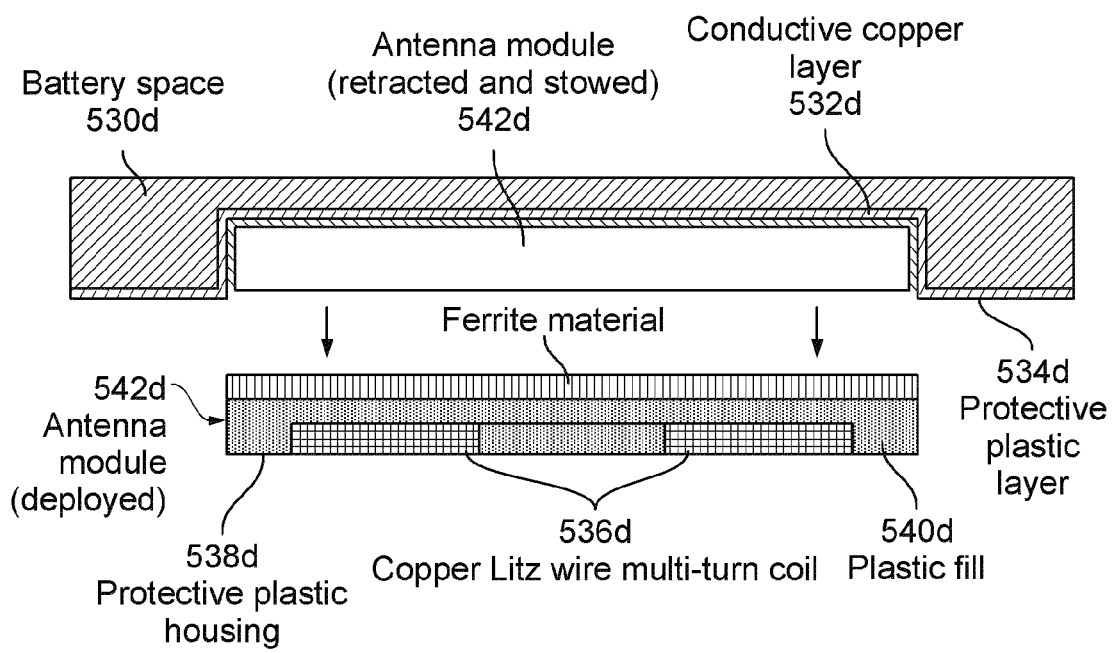

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 5d38 from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
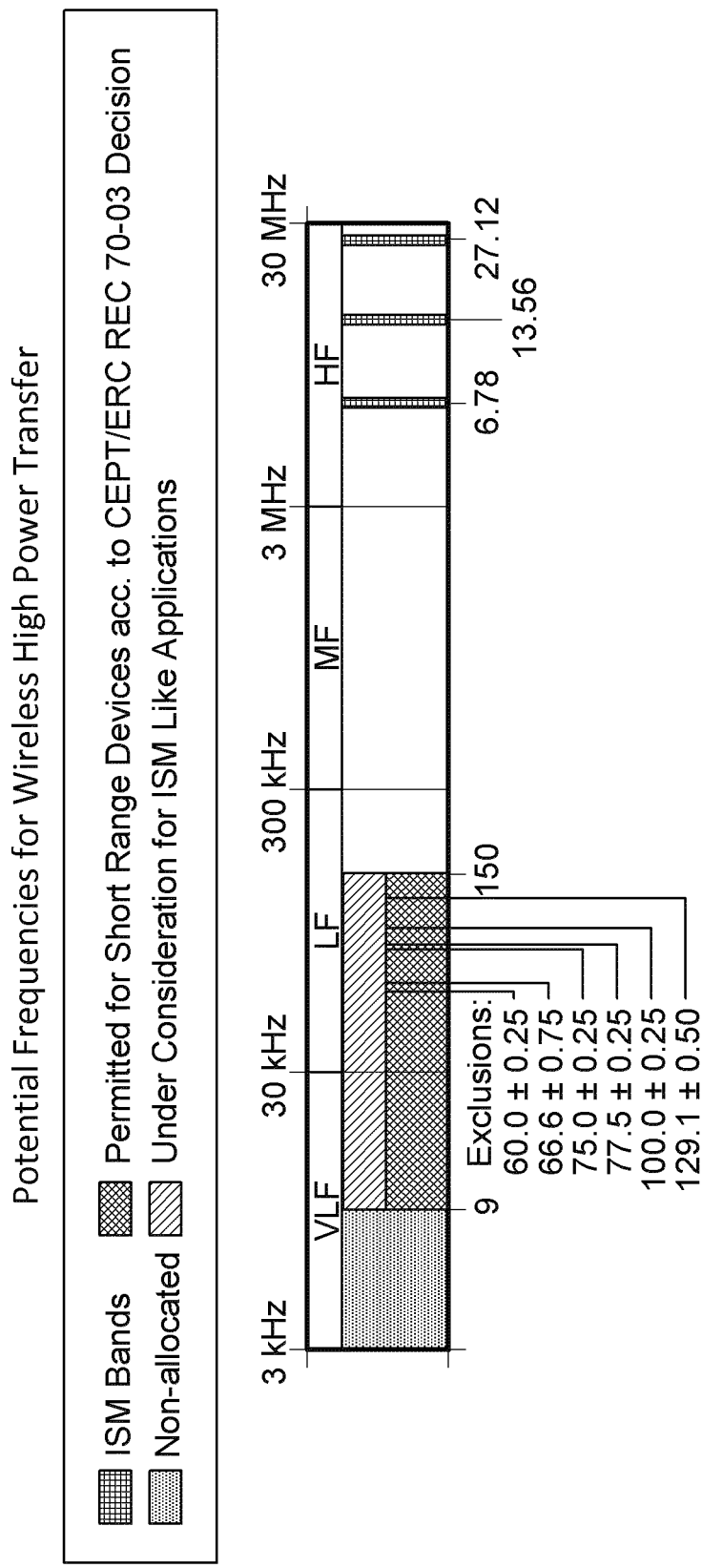
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
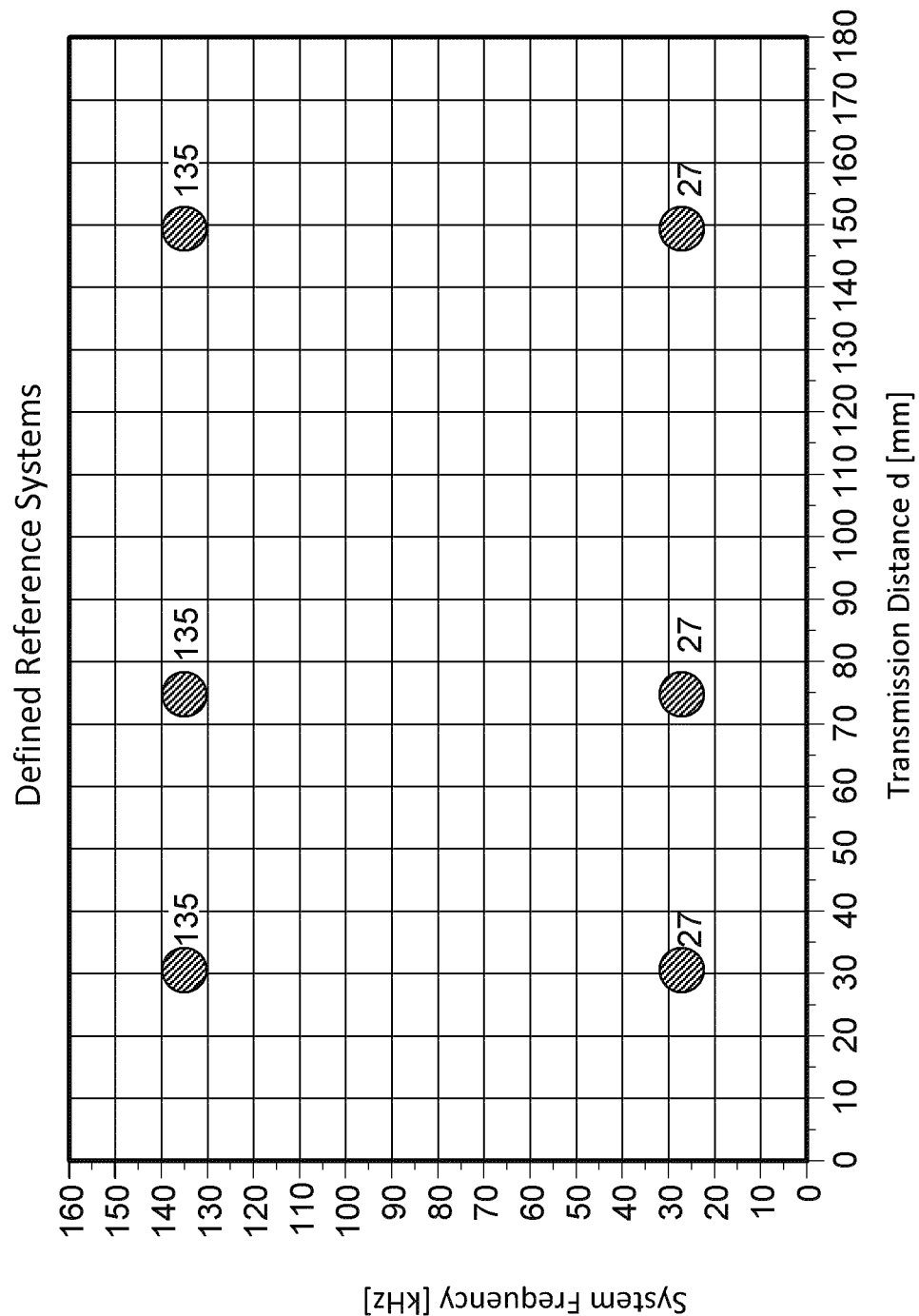
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

Living beings (e.g., humans or animals) or other unwanted objects may enter a region between a vehicle and the ground, risking exposure to hazardous conditions. Existing systems utilize vehicle immobilization upon detection of such a living being below the vehicle to avoid running over or otherwise impacting the living being upon movement of the vehicle. Other existing systems seek to repel living beings from entering regions in which they can be potentially exposed to hazardous conditions (e.g., ultrasonic systems configured to repel martens from the vehicle engine).

In the case of an electric vehicle with an undercarriage charging system, living beings that are underneath the vehicle may be exposed to electromagnetic fields that are at unacceptable levels (e.g., above limits as defined by international or national safety guidelines and regulations). For example, during the charging process, the magnetic flux density in a region between the electric vehicle and the charging pad may exceed critical levels (e.g., limits as defined by safety guidelines and regulations, which are generally selected to be lower than levels that would damage a living being in the region).

Therefore, to avoid electromagnetic field exposure at unacceptable levels, it can be advantageous to utilize a detection system configured to detect whether a moving object (e.g., a living being having a volume greater than 500 cm$^3$) is in an exclusion zone prior to beginning the charging process. The exclusion zone can be defined as a volume from which living beings are desired to be excluded. For example, the exclusion zone can be the volume in which electromagnetic field (EMF) exposure can exceed predetermined limits, or can be the complete volume underneath the vehicle (e.g., region between the vehicle and the ground bounded by the vehicle outline). Other definitions of the exclusion zone are also compatible with certain embodiments described herein.

Upon detection of a moving object (e.g., living being) within the exclusion zone, the wireless charging system can pause power transfer for a predetermined period of time. During this pause period, the detection system can continue to monitor the exclusion zone. Power transfer can resume (e.g., automatically without user intervention), if there is no moving object detected in the exclusion zone for the duration of the pause period. The wireless charging system can comprise a controller (e.g., processor or other control structure as described above) configured to receive signals from the detection system indicative of whether there is a moving object in the exclusion zone or not, and configured to transmit appropriate control signals to other portions of the wireless charging system.

Figure 8A:
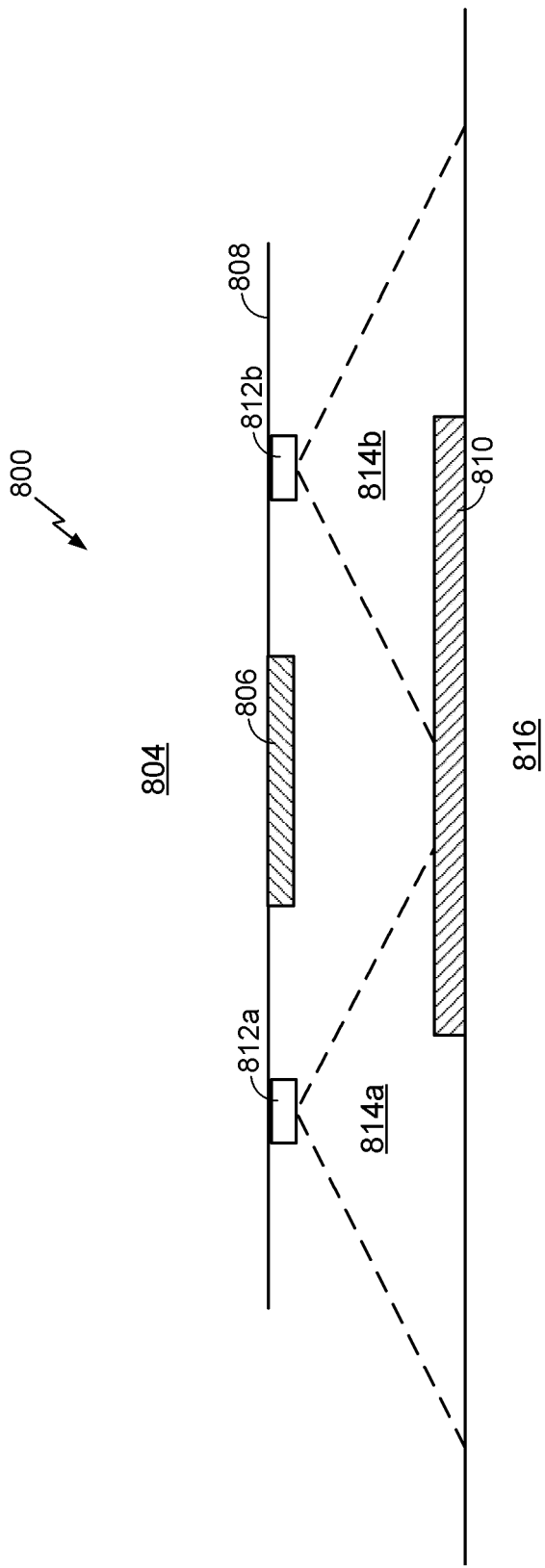
FIGS. 8A and 8B schematically illustrate example detection apparatus configured to monitor at least a portion of the exclusion zone in accordance with certain embodiments described herein.
Figure 8B:
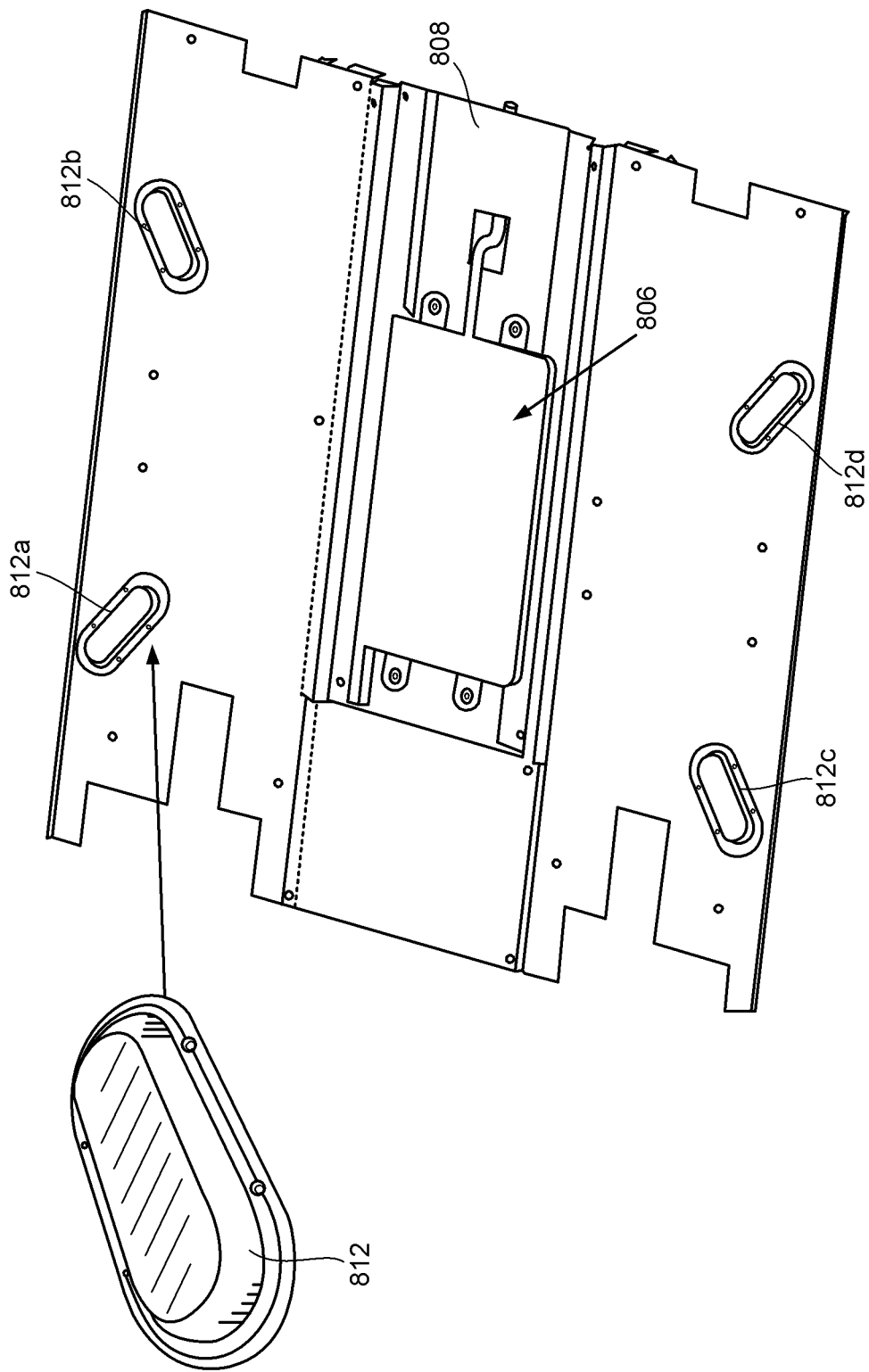

FIGS. 8A and 8B schematically illustrate example detection apparatus 800 configured to monitor at least a portion of the exclusion zone 802 in accordance with certain embodiments described herein. The detection apparatus 800 is positioned to monitor at least a portion of the exclusion zone 802 underneath the vehicle 804 (e.g., in proximity to a vehicle charging pad 806) and to detect existence of a moving object (e.g., living being) within the exclusion zone 802. For example, the vehicle charging pad 806 can be on a first portion of the vehicle (e.g., on the vehicle's underbody structure 808) and the detection apparatus 800 can be on a surface of a second portion of the vehicle. When the vehicle 804 is positioned for wireless power transfer between the vehicle charging pad 806 and a base charging pad 810, the portion of the exclusion zone 802 being monitored by the detection apparatus 800 is also in proximity to the base charging pad 810.

The detection apparatus 800 comprises at least one antenna assembly 812 configured to transmit radiation and to receive radiation reflected from material within the exclusion zone 802. For example, the at least one antenna assembly 812 can comprise one or more antennas configured to transmit electromagnetic radiation (e.g., energy waves) and one or more antennas configured to receive at least a portion of the emitted radiation after it has reflected from material within the exclusion zone. The one or more antennas configured to transmit radiation can be the same one or more antennas configured to receive the reflected radiation, or the one or more antennas configured to transmit radiation can be separate and spaced from the one or more antennas configured to receive the reflected radiation.

The at least one antenna assembly 812 of FIGS. 8A and 8B is on an underbody structure 808 of the electric vehicle 804, but other positions of the at least one antenna assembly 812 can be used. For example, the at least one antenna assembly 812 can be integrated into the base charging pad 810 of the wireless charging system, such that the at least one antenna assembly 812 monitors the portion of the exclusion zone 802 in proximity to both the vehicle charging pad 806 and the base charging pad 810 when the vehicle 804 is positioned for wireless power transfer.

As shown in the side view of FIG. 8A, multiple antenna assemblies (e.g., two or more) can be mounted at the vehicle bottom (e.g., adjacent to the vehicle-side power charging pad 806). This location can be advantageous with regard to discriminating return signals from moving objects outside the exclusion zone 802. The two antenna assemblies shown in FIG. 8A (labeled 812*a* and 812*b*) can be configured to detect moving objects or living beings in two corresponding regions 814*a*, 814*b*(e.g., surveillance spaces; denoted by dashed lines) between the vehicle underbody structure 806 and the ground 816 and extending at least partially over the base charging pad 810. While FIG. 8A schematically shows the regions 814*a*, 814*b* as not overlapping one another, these regions 814*a*, 814*b* can be overlapping in other configurations, such that there is a region in which both antenna assemblies 812*a*, 812*b* can detect the moving object or living being. In addition, other configurations can utilize more than two antenna assemblies 812 and more than two regions 814 (e.g., surveillance spaces), which may at least partially overlap one another.

In certain embodiments, the detection system 800 can utilize microwave Doppler radar to detect motion of the object or living being. Microwave Doppler radar systems transmit microwave electromagnetic radiation (e.g., energy waves) towards a target region and receive return signals (e.g., energy waves) reflected from objects within the target region. The frequency of these return signals is indicative of a velocity of the object (relative to the detector) from which the return signal is reflected. An example suitable operating frequency for such microwave Doppler radar for detecting objects or living beings within the exclusion zone can be 24 GHz/K-Band inside the internationally harmonized band (EU, UK, NA). Other operating frequencies are also compatible with certain embodiments described herein. The detection system 800 can comprise at least one antenna assembly 812 configured to irradiate the portion of the exclusion zone 802 with microwave electromagnetic radiation, and at least one antenna assembly 812 configured to receive return signals from the moving objects or living beings within the exclusion zone. As shown in the planar view of FIG. 8B, four antenna assemblies 812 (labeled as 812*a*, 812*b*, 812*c*, 812*d*; and which can be referred to as "radar modules") can be positioned in a generally rectangular pattern on or integral with a vehicle shield of the electric vehicle 804, with the vehicle charging pad 806 positioned between the antenna assemblies 812. Each antenna assembly 812 can have a housing and an integrated microwave front end and a Doppler detector unit.

Figure 9:
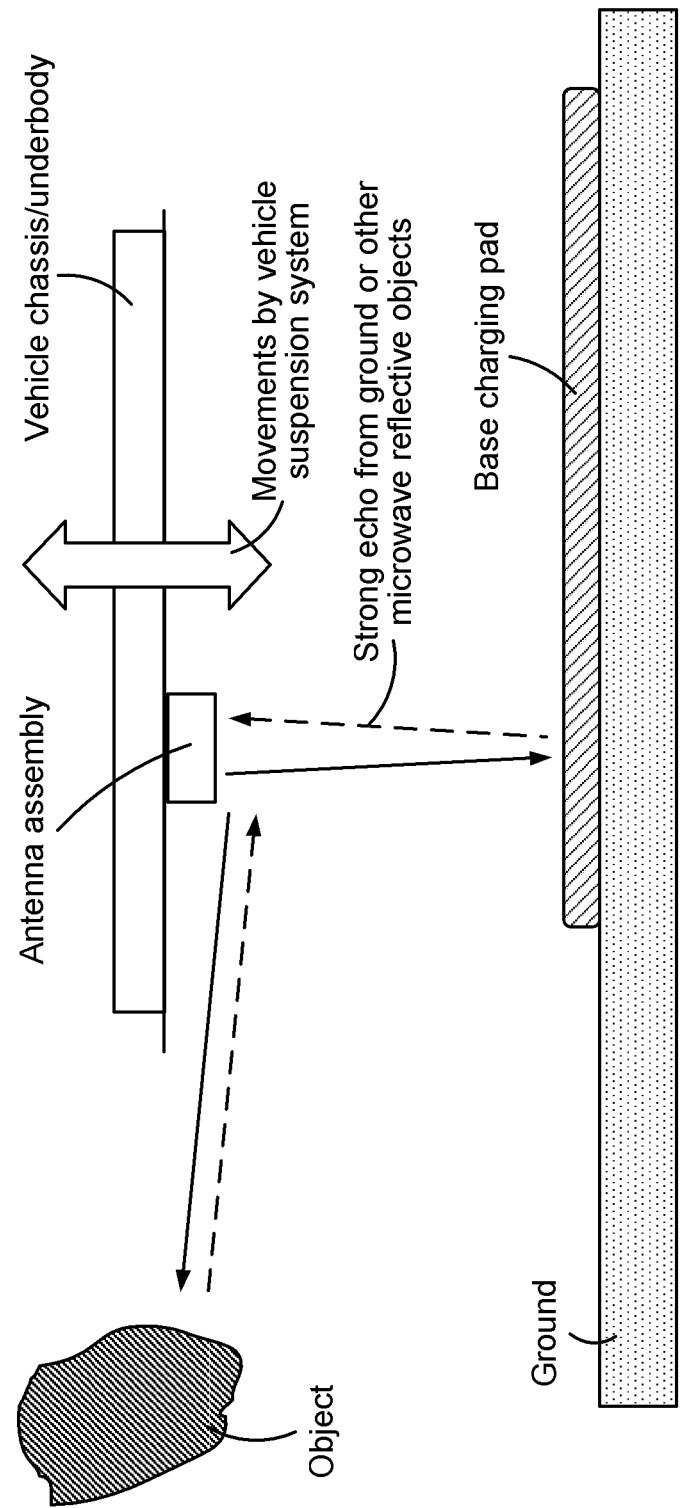
FIG. 9 schematically illustrates two example potential contributions to false detection events for a microwave Doppler radar detection system.

FIG. 9 schematically illustrates two example potential contributions to false detection events for a microwave Doppler radar detection system. "Nadir" pointing radar detection systems mounted at the bottom of a vehicle may transmit microwave radiation towards the ground (schematically illustrated by the nearly vertical solid arrow of FIG. 9) and may receive strong return signals (e.g., echoes) from the ground or from any other microwave-reflective object on the ground (schematically illustrated by the nearly vertical dashed arrow of FIG. 9). When the vehicle moves slightly up and down (e.g., due to bouncing of the vehicle suspension system, persons entering or leaving the vehicle, wind forces acting on the vehicle) (schematically illustrated by the double-headed arrow in FIG. 9), the received return signals resulting from reflections of the microwave radiation from the ground can be mistaken as return signals reflected from a moving object or living being within the exclusion zone, resulting in a false detection event.

In addition, such "nadir" pointing radar detection systems may also transmit microwave radiation generally parallel to the ground (schematically illustrated by the nearly horizontal solid arrow of FIG. 9) and may receive strong return signals (e.g., echoes) from microwave-reflective objects outside the exclusion zone (schematically illustrated by the nearly horizontal dashed arrow of FIG. 9). These received return signals resulting from reflections from objects or living beings outside the exclusion zone can be mistaken as return signals reflected from a moving object or living being within the exclusion zone, resulting in a false detection event.

Figure 10:
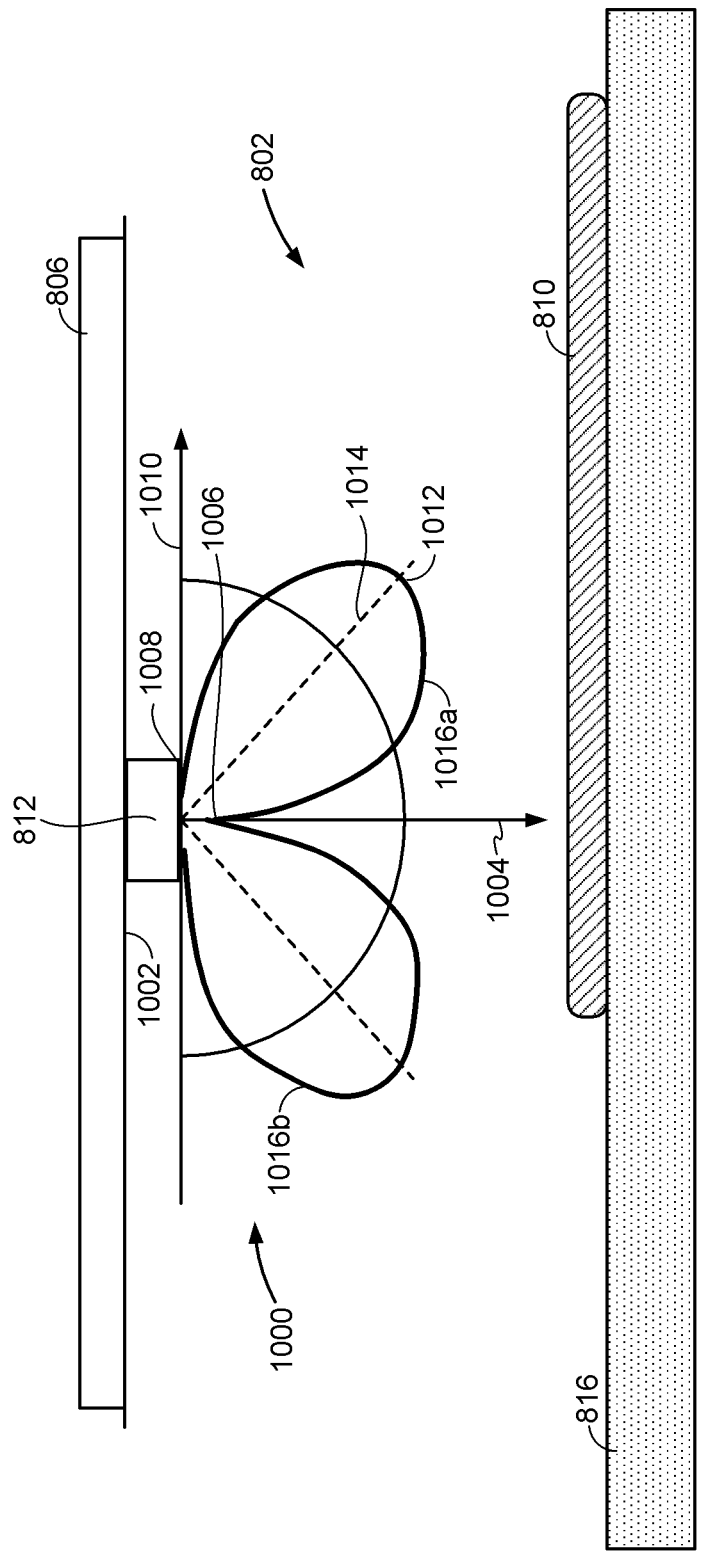
FIG. 10 schematically illustrates a planar cross-section of an example radiation pattern compatible with certain embodiments described herein.

Certain embodiments described herein advantageously mitigate against such false detection events by using microwave radar antennas having an optimized radiation pattern (e.g., for transmitted radiation, received radiation, or both) representing an optimal trade-off with regard to sensitivity to wanted and unwanted return signals (e.g., echoes). In certain embodiments, the optimized radiation pattern can be configured to attenuate return signals (e.g., echoes) from the ground and from objects outside the exclusion zone along directions with low elevation angles. FIG. 10 schematically illustrates a planar cross-section of an example radiation pattern 1000 compatible with certain embodiments described herein. The radiation pattern 1000 of FIG. 10 can be representative of the magnitude of the gain generated by (and/or the magnitude of the gain received by) at least one antenna assembly 812 mounted to a surface 1002 (e.g., a surface comprising a portion of an underbody 806 of the vehicle chassis and having a normal direction 1004 pointing towards the ground). The at least one antenna assembly 812 can be configured to generate radiation and to receive radiation reflected from material within the exclusion zone 802. As shown in FIG. 10, the radiation pattern 1000 for at least one of the transmitted radiation and the received radiation can have a maximum gain and can have a gain along a line 1004 perpendicular to the surface 1002 less than half of the maximum gain on a linear scale.

The planar cross-section of FIG. 10 is in a plane perpendicular to the surface 1002. The radiation pattern 1000, in the plane perpendicular to the surface 1002 has a first gain 1006 along a first line 1004 perpendicular to the surface (e.g., along a vertical axis, shown schematically in FIG. 10 by a downward-pointing vertical arrow), a second gain 1008 along a second line 1010 parallel to the surface 1002 (e.g., along a horizontal axis, shown schematically in FIG. 10 by a rightward-pointing horizontal arrow), and a maximum gain 1012 along a third line 1014 between the first line 1004 and the second line 1010 (e.g., along a line 1014 shown schematically in FIG. 10 by a dashed line). The first gain 1006 is less than half the maximum gain 1012 and the second gain 1008 is less than half the maximum gain 1012 on a linear scale.

The radiation pattern 1000 shown in FIG. 10 can be described as being generally omnidirectional in azimuth (e.g., generally rotationally symmetric about the vertical axis) and as having a lobe in elevation along the third line 1014 (e.g., at an angle relative to the horizontal axis). The radiation pattern 1000 can have gain minima at elevation of zero degrees (e.g., along the second line 1010 which is along the horizontal axis) and at elevation of 90 degrees (e.g., along the first line 1004 which is along the vertical axis). The third line 1014 can be at an elevation angle (e.g., relative to the horizontal axis 1010) of about 30 degrees, about 35 degrees, about 40 degrees, about 45 degrees, about 50 degrees, about 55 degrees, about 60 degrees, between 30 and 35 degrees, between 35 and 40 degrees, between 40 and 45 degrees, between 45 and 50 degrees, between 50 and 55 degrees, or between 55 and 60 degrees. The radiation pattern 1000 can be generally rotationally symmetric about the first line 1004 (e.g., about the vertical axis). The at least one antenna assembly 812 can be positioned along the first line 1004 (e.g., along the vertical axis).

For other radiation patterns 1000 compatible with certain embodiments described herein, the maximum gain 1012 on a linear scale can be greater than the first gain 1006 by a factor of 2, 3, 4, 5, 6, 7, 8, 9, 10, 20, 50, or more, greater than the second gain 1008 by a factor of 2, 3, 4, 5, 6, 7, 8, 9, 10, 20, 50, or more, or both. The first gain 1006 can be less than the maximum gain 1012 by at least 10 dB on a logarithmic scale and the second gain 1008 can be less than the maximum gain 1012 by at least 10 dB on a logarithmic scale. The first gain 1006 can be the same or different from the second gain 1008. The gain of the lobe portion on a first side of the vertical axis (e.g., a first lobe portion 1016a between the vertical axis and the portion of the horizontal axis on the right-side of the vertical axis of FIG. 10) can be the same or different from the gain of the lobe portion on a second side of the vertical axis (e.g., a second lobe portion 1016b between the vertical axis and the portion of the horizontal axis on the left-side of the vertical axis of FIG. 10). If the gains of these two lobe portions 1016a, 1016b are different from one another, the greater gain of the two can be considered the maximum gain 1012.

In certain embodiments, multiple antenna assemblies 812 can be used that are optimally spaced from one another to receive return signals from corresponding portions of the exclusion zone 802 such that substantially all of the exclusion zone 802 can be monitored by the detection system 800. When using multiple antenna assemblies 812, the operating frequency and transmit level of each antenna assembly 812 can be controlled to prevent false detection events due to mutual interference and receiver overloading (e.g., in case of temperature drift, aging, or other conditions). For commercial, off-the-shelf microwave radar antenna assemblies, frequency can be controlled by means of changing local oscillator supply voltage, and the transmit level of the antenna assemblies 812 can be reduced (e.g., attenuated by 3 to 10 dB) by placing absorber foam material on each antenna assembly 812.

Figure 11:
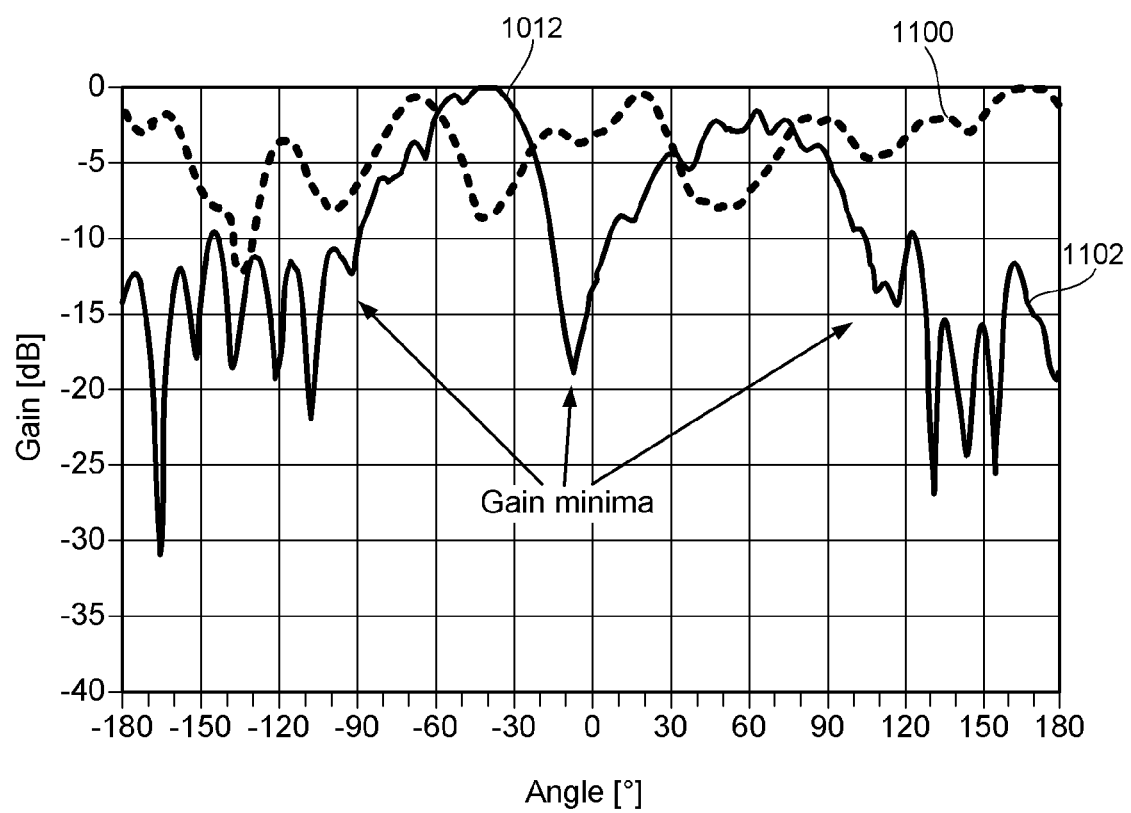
FIG. 11 is a plot of the azimuthal pattern and the elevation pattern for an example radiation pattern in accordance with certain embodiments described herein.

FIG. 11 is a plot of the measured azimuthal pattern 1100 and the measured elevation pattern 1102 for an example radiation pattern 1000 in accordance with certain embodiments described herein. The radiation pattern 1000 of FIG. 11 has been measured on an arrangement of two "λ/4" monopole rod antennas 812 (e.g., having a length approximately equal to one-fourth of the wavelength of the emitted radiation) which can be vertically oriented relative to the surface 1002 of the vehicle's underbody 808. The azimuthal pattern 1100 of FIG. 11 shows the variation of the gain as a function of angle (e.g., relative to a reference direction within a plane parallel to the surface 1002 of the vehicle's underbody 808) about the vertical axis (e.g., the direction perpendicular to the surface 1002) to be within a range of about −12 dB. Such a radiation pattern 1000 is an example of a radiation pattern that is generally omnidirectional in azimuth. The elevation pattern 1102 of FIG. 11 shows the variation of the gain as a function of angle from the vertical axis (e.g., the direction perpendicular to the surface 1002) to have gain minima at about zero degrees and at about ±90 degrees. The radiation pattern 1000 of FIG. 11 was obtained from the antenna assembly 812 alone (e.g., two monopole antennas with a small ground plane) and without a large vehicle shield. This may explain the two minima nominally at ±90 degrees occurring at slightly larger angles (e.g., below the horizon). The radiation pattern 1000 has a lobe with a maximum gain 1012 at an elevation angle of about 40-70 degrees. For the elevation pattern 1102 of FIG. 11, the negative values of angle correspond to a first lobe portion 1016a on a first side of the vertical axis and the positive values of angle correspond to a second lobe portion 1016b on a second side (opposite to the first side) of the vertical axis.

Figure 12:
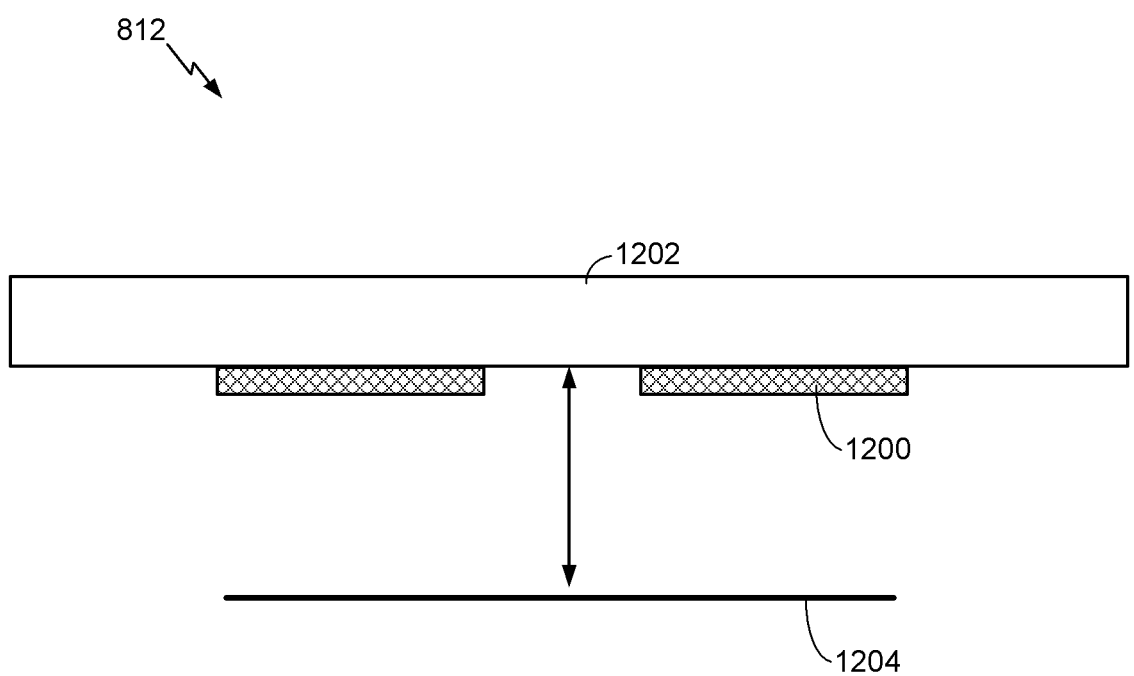
FIG. 12 schematically illustrates an example antenna assembly compatible with certain embodiments described herein.

FIG. 12 schematically illustrates an example antenna assembly 812 compatible with certain embodiments described herein. The antenna assembly 812 of FIG. 12 comprises at least one patch antenna 1200 (e.g., a patch array) mounted on a substrate 1202. The at least one patch antenna 1200 generates a radiation pattern 1000 having a lobe pointing in the downward vertical direction (e.g., towards the ground 816). The antenna assembly 812 of FIG. 12 further comprises at least one metal plate 1204 positioned below the at least one patch antenna 1200 by a distance (schematically illustrated in FIG. 12 by the double-sided arrow). For a 24-GHz system, the distance can be between 5 millimeters and 10 millimeters below the at least one patch antenna 1200. The metal plate 1204 is configured to alter the radiation pattern 1000 such that the gain in the downward vertical direction is reduced, and to produce lobes at a predetermined elevation angle between the horizontal axis and the vertical axis. To avoid microphony effects (which can be detrimental in conjunction with a microwave Doppler radar system), the metal plate 1204 can be acoustically damped (e.g., using foam material placed between the substrate 1202 and the metal plate 1204) such that the metal plate 1204 does not substantially vibrate or oscillate in position relative to the substrate 1202.

Figure 13:
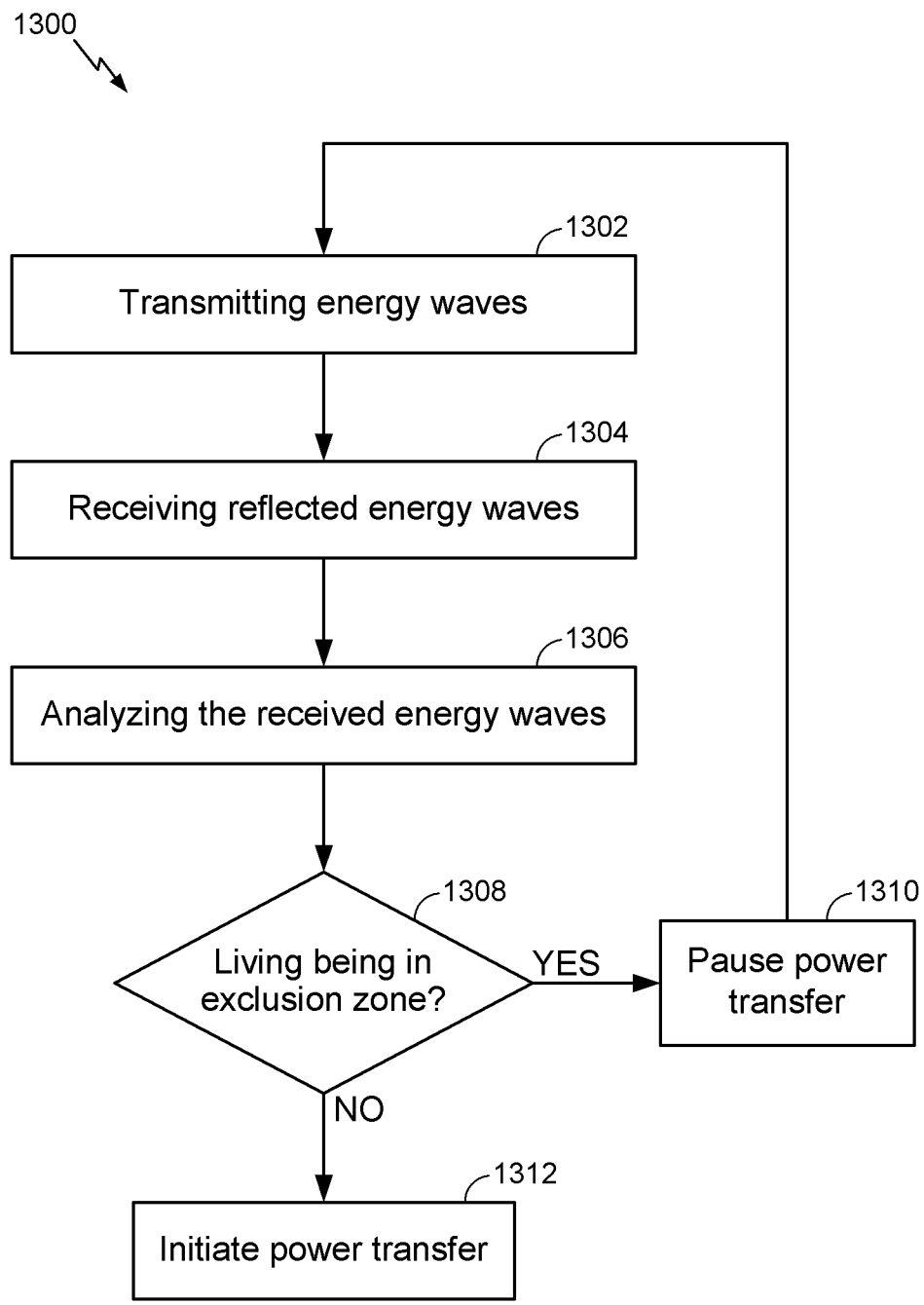
FIG. 13 is a flow diagram of an example method of controlling a wireless charging system of an electric vehicle in accordance with certain embodiments described herein.

FIG. 13 is a flow diagram of an example method 1300 of controlling a wireless charging system of an electric vehicle in accordance with certain embodiments described herein. The method 1300 comprises transmitting energy waves in a region below an underside surface of the electric vehicle in an operational block 1302. The method 1300 further comprises receiving energy waves reflected from material within the region in an operational block 1304. The method 1300 further comprises analyzing the received energy waves to determine whether the received energy waves are indicative of a living being within the region in operational blocks 1306 and 1308. The transmitted energy waves can be in a pattern having a maximum gain and having a first gain along a line perpendicular to the surface less than half of the maximum gain. The received energy waves can be in a pattern having a maximum gain and having a first gain along a line perpendicular to the surface less than half of the maximum gain.

The method 1300 of FIG. 13 further comprises, upon determining that the received energy waves are indicative of a moving object (e.g., living being) within the region in an operational block 1308, pausing power transfer by the wireless charging system in an operational block 1310. The method 1300 further comprises continuing said transmitting, said receiving, and said analyzing while power transfer is paused (e.g., for the duration of the paused period). The method 1300 further comprises, upon determining that the received energy waves are not indicative of a moving object (e.g., living being) within the region in the operational block 1308 while power transfer is paused, initiating power transfer by the wireless charging system in an operational block 1312.

The wireless power charging system can comprise means for wirelessly transferring power to the electric vehicle 804 (e.g., a base charging pad 810, a vehicle charging pad 806, and other structure utilized in transferring power to the electric vehicle 804 as described herein), at least one means for receiving electromagnetic radiation, and at least one means for transmitting electromagnetic radiation. At least one of the received electromagnetic radiation and the transmitted electromagnetic radiation has a radiation pattern 1000. The radiation pattern 1000 can have a maximum gain 1012 and can have a first gain 1006 along a first line 1004 perpendicular to the surface 1002 less than half of the maximum gain 1012 on a linear scale. The at least one receiving means can comprise at least one microwave radar sensor or at least one antenna assembly 812. The at least one transmitting means can comprise at least one antenna assembly 812 (e.g., the same at least one antenna assembly of the at least one receiving means). The wireless power charging system can further comprise means for controlling the transferring means in response to signals from the at least one receiving means. The controlling means can comprise a processor configured to receive signals from the at least one receiving means and to transmit control signals to the transferring means.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charging system for an electric vehicle, the system comprising:
    a vehicle charging pad configured to wirelessly receive power from a base charging pad spaced from the vehicle charging pad; and
    a detection apparatus on a surface of the vehicle, the detection apparatus configured to detect existence of a moving object within an exclusion zone underneath the vehicle, the detection apparatus comprising at least one antenna assembly configured to transmit radiation and to receive radiation reflected from material within the exclusion zone, the at least one antenna assembly having a radiation pattern for at least one of the transmitted radiation and the received radiation having a maximum gain and having a first gain intensity along a first line perpendicular to the surface less than half of the maximum gain on a linear scale.

2. The system of claim 1, wherein the at least one antenna assembly is positioned along the first line and the radiation pattern has, in a plane perpendicular to the surface, the first gain along the first line, a second gain along a second line parallel to the surface, and the maximum gain along a third line between the first line and the second line, wherein the first gain is less than the maximum gain by at least 10 dB on a logarithmic scale and the second gain is less than the maximum gain by at least 10 dB on a logarithmic scale.

3. The system of claim 2, wherein the third line is about 30 degrees, about 35 degrees, about 40 degrees, about 45 degrees, about 50 degrees, about 55 degrees, or about 60 degrees from the first line.

4. The system of claim 2, wherein the third line is between 30 and 35 degrees, between 35 and 40 degrees, between 40 and 45 degrees, between 45 and 50 degrees, between 50 and 55 degrees, or between 55 and 60 degrees from the first line.

5. The system of claim 2, wherein the radiation pattern is generally omnidirectional in azimuth and has at least one lobe in elevation along the third line.

6. The system of claim 1, wherein the radiation pattern is generally rotationally symmetric about the first line.

7. The system of claim 1, wherein the surface comprises a portion of an underbody of the vehicle and the surface has a normal direction pointing towards the ground.

8. The system of claim 1, further comprising a controller operatively coupled to the detection apparatus and to at least one of the vehicle charging pad and the base charging pad, the controller configured to receive at least one first signal from the detection apparatus, the at least one first signal indicative of existence of a moving object within the exclusion zone, the controller configured to respond to the at least one first signal.

9. The system of claim 8, wherein the controller is configured to respond to the at least one first signal by pausing power transfer between the base charging pad and the vehicle charging pad for a predetermined period of time.

10. The system of claim 8, wherein the detection apparatus is configured to continue monitoring the exclusion zone during the paused period of time.

11. The system of claim 8, wherein the controller is further configured to respond to at least one second signal indicative of no existence of a moving object within the exclusion zone.

12. The system of claim 11, wherein the controller is configured to respond to the at least one second signal by initiating power transfer between the base charging pad and the vehicle charging pad.

13. A method of controlling a wireless charging system of an electric vehicle, the method comprising:
transmitting energy waves in a pattern in a region below an underside surface of the electric vehicle, the pattern having a maximum gain and having a first gain along a first line perpendicular to the underside surface less than half of the maximum gain on a linear scale;
receiving energy waves reflected from material within the region; and
analyzing the received energy waves to determine whether the received energy waves are indicative of a moving object within the region.

14. The method of claim 13, wherein the pattern has, in a plane perpendicular to the underside surface, the first gain along the first line, a second gain along a second line parallel to the underside surface, the maximum gain along a third line between the first line and the second line, wherein the first gain is less than the maximum gain by at least 10 dB on a logarithmic scale and the second gain is less than the maximum gain by at least 10 dB on a logarithmic scale.

15. The method of claim 14, wherein the third line is about 30 degrees, about 35 degrees, about 40 degrees, about 45 degrees, about 50 degrees, about 55 degrees, or about 60 degrees from the first line.

16. The method of claim 14, wherein the third line is between 30 and 35 degrees, between 35 and 40 degrees, between 40 and 45 degrees, between 45 and 50 degrees, between 50 and 55 degrees, or between 55 and 60 degrees from the first line.

17. The method of claim 14, wherein the pattern is generally omnidirectional in azimuth and has at least one lobe in elevation along the third line.

18. The method of claim 13, wherein the pattern is generally rotationally symmetric about the first line.

19. The method of claim 13, further comprising, upon determining that the received energy waves are indicative of a moving object within the region, pausing power transfer by the wireless charging system.

20. The method of claim 19, further comprising continuing said transmitting, said receiving, and said analyzing while power transfer is paused.

21. The method of claim 20, further comprising, upon determining that the received energy waves are not indicative of a moving object within the region while power transfer is paused, initiating power transfer by the wireless charging system.

22. A method of controlling a wireless charging system of an electric vehicle, the method comprising:
transmitting energy waves in a region below an underside surface of the electric vehicle;
receiving, in a pattern, energy waves reflected from material within the region, the pattern having a maximum gain and having a first gain along a first line perpendicular to the underside surface less than half of the maximum gain on a linear scale; and
analyzing the received energy waves to determine whether the received energy waves are indicative of a moving object within the region.

23. The method of claim 22, wherein the pattern has, in a plane perpendicular to the underside surface, the first gain along the first line, a second gain along a second line parallel to the underside surface, the maximum gain along a third line between the first line and the second line, wherein the first gain is less than the maximum gain by at least 10 dB on a logarithmic scale and the second gain is less than the maximum gain by at least 10 dB on a logarithmic scale.

24. The method of claim 23, wherein the third line is about 30 degrees, about 35 degrees, about 40 degrees, about 45 degrees, about 50 degrees, about 55 degrees, or about 60 degrees from the first line.

25. The method of claim 23, wherein the third line is between 30 and 35 degrees, between 35 and 40 degrees, between 40 and 45 degrees, between 45 and 50 degrees, between 50 and 55 degrees, or between 55 and 60 degrees from the first line.

26. The method of claim 23, wherein the pattern is generally omnidirectional in azimuth and has at least one lobe in elevation along the third line.

27. The method of claim 22, wherein the pattern is generally rotationally symmetric about the first line.

28. The method of claim 22, further comprising, upon determining that the received energy waves are indicative of a moving object within the region, pausing power transfer by the wireless charging system.

29. The method of claim 28, further comprising continuing said transmitting, said receiving, and said analyzing while power transfer is paused.

30. The method of claim 29, further comprising, upon determining that the received energy waves are not indicative of a moving object within the region while power transfer is paused, initiating power transfer by the wireless charging system.

31. A wireless charging system for an electric vehicle, the system comprising:
means for wirelessly transferring power to the electric vehicle;
at least one means for receiving electromagnetic radiation; and
at least one means for transmitting electromagnetic radiation, at least one of the received electromagnetic radiation and the transmitted electromagnetic radiation having a radiation pattern, the radiation pattern having a maximum gain and having a first gain along a first line perpendicular to the surface less than half of the maximum gain on a linear scale.

32. The system of claim 31, wherein the transferring means comprises a base charging pad configured to transmit wireless power and a vehicle charging pad configured to receive the wireless power from the base charging pad.

33. The system of claim 31, wherein the at least one receiving means comprises at least one microwave radar sensor.

34. The system of claim 31, wherein the at least one transmitting means comprises at least one antenna assembly.

35. The system of claim 34, wherein the at least one receiving means comprises the at least one antenna assembly.

36. The system of claim 31, further comprising means for controlling the transferring means in response to signals from the at least one receiving means.

37. The system of claim 36, wherein the controlling means comprises a processor configured to receive signals from the at least one receiving means and to transmit control signals to the transferring means.

* * * * *